United States Patent [19]

Kasugai

[11] Patent Number: 4,726,488

[45] Date of Patent: Feb. 23, 1988

[54] CAP WITH VALVE

[75] Inventor: Joji Kasugai, Ichinomiya, Japan

[73] Assignee: Toyoda Gosei Co., Ltd., Nishikasugai, Japan

[21] Appl. No.: 42,750

[22] Filed: Apr. 27, 1987

[30] Foreign Application Priority Data

Aug. 30, 1986 [JP] Japan .............................. 61-133161[U]

[51] Int. Cl.⁴ .............................................. B65D 51/16
[52] U.S. Cl. ..................................... 220/203; 220/303;
 220/DIG. 32; 137/493.9
[58] Field of Search ....... 220/203, 204, 303, DIG. 32,
 220/DIG. 33, 206, 367; 137/493.9

[56] References Cited

U.S. PATENT DOCUMENTS

| | | | |
|---|---|---|---|
| 4,051,975 | 10/1977 | Ohgida et al. | 220/203 |
| 4,102,472 | 7/1978 | Sloan, Jr. | 220/295 |
| 4,294,376 | 10/1981 | Keller | 220/318 |
| 4,494,673 | 1/1985 | Hiraishi | 220/288 |
| 4,498,493 | 2/1985 | Harris | 220/203 |
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,676,390 | 6/1987 | Harris | 220/203 |

Primary Examiner—George T. Hall
Attorney, Agent, or Firm—Cushman, Darby & Cushman

[57] ABSTRACT

A cap with valve where a seal member is disposed in a fluid flow path of a cap body and urged against a prescribed seal portion. The seal member is of disk-like form or ring form, and provided with lip elements projecting throughout whole circumference of periphery and with recesses formed throughout whole circumference at rear side of the lip elements and having constant length in the radial direction. The seal member is assembled and held to the support plate from rear side of the lip elements and disposed in the cap body so that the lip elements are urged against the prescribed seal portion through biasing means. The cap with valve is provided at opposite surface on rear side of the lip elements in the support plate with an arc-shaped projection fitted corresponding to whole circumference of bottom portion in the radial direction of the seal member at the recesses.

4 Claims, 11 Drawing Figures

PRIOR ART

CAP WITH VALVE

BACKGROUND OF THE INVENTION (1) Field of the Invention

The present invention relates to a cap with valve, such as a fuel cap or a radiator cap for automobiles, which is installed to an aperture of a container such as a fuel tank or a radiator and adjusts pressure in the container.

(2) Description of the Prior Art

Figure 1:
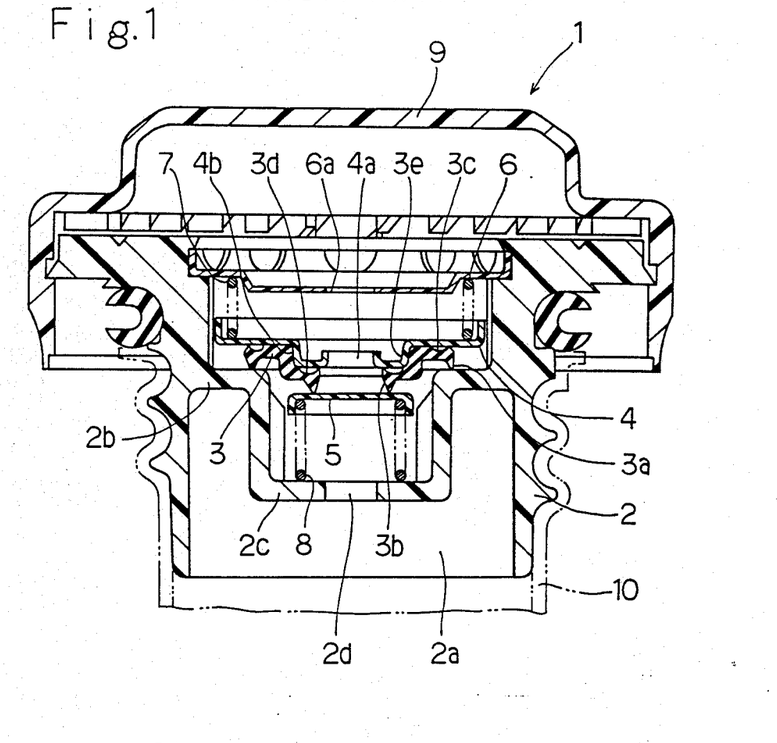
FIG. 1 is a sectional view of a cap with valve in the prior art.
Figure 2:
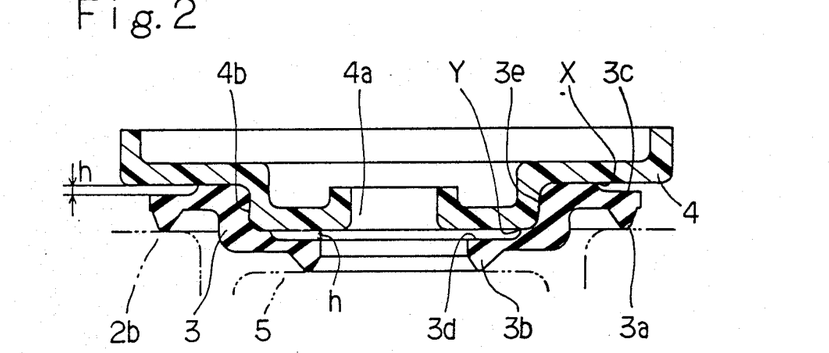
FIG. 2 is a sectional view of the prior art illustrating state of a seal member assembled to a support plate.

Such a cap with valve in the prior art, for example, a fuel cap to be installed to a filler neck of an automobile is disclosed in Japanese utility model application laid-open No. 179654/1985 (U.S. Pat. No. 4,572,396) as shown in FIGS. 1-2.

In a fuel cap 1, an annular seal member 3 is provided with lip elements 3a, 3b projecting downwards at outer and inner peripheries respectively, and an annular groove 3e is formed on upper surface of the inner lip element 3b so that the inner lip element 3b is positioned lower than the outer lip element 3a. The annular groove 3e of the seal member 3 is fitted to a stepped porion 4b of an annular support plate 4 thereby the seal member 3 is assembled and held to the support plate 4. At inside of a cap body 2 threadedly installed to a filler neck 10, the outer lip element 3a of the seal member 3 is pressed against a stepped portion 2b of a fluid flow path 2a of the cap body 2 through a bias means, and the inner lip element 3b is pressed against a valve plate 5 through a bias means. A spring shoe 6 is provided at the center with a fluid flowing hole 6a, and arranged on upper side of the fluid flow path 2a. A coil spring 7 as a bias means urges the support plate 4 downwards, and presses the outer lip element 3a of the seal member 3 against the stepped portion 2b. Also a coil spring 8 presses the valve plate 5 against the inner lip element 3b from a spring shoe 3c extending downward from the stepped portion 2b. An upper cover 9 is fitted to upper side of the cap body 2.

At rear side of the outer and inner lip elements 3a, 3b in the seal member 3, recesses 3c, 3d to make each radial length constant are formed throughout the whole circumference at rear side of the outer and inner lip elements 3a, 3b so that prescribed gap h is provided between the seal member 3 and the support plate 4 at non-pressed state of the seal member 3.

Operation state of the fuel cap 1 will be described. First, when pressure in a fuel tank (not shown) is positive, the valve plate 5, the seal member 3 and the support plate 4 are elevated against the biasing force of the spring 7. Since the outer lip element 3a of the seal member 3 and the stepped portion 2b of the cap body 2 are separated from each other, fluid such as air in the tank flows from the fluid flowing hole 2d of the spring shoe 2c through the gap and the fluid flowing hole 6a of the spring shoe plate 6 so as to adjust the pressure within the tank. On the contrary, when the pressure in the fuel tank is negative, the valve plate 5 is lowered against the biasing force of the spring 8. Since the inner lip elements 3b of the seal member 3 and the valve body 5 are separated from each other, fluid such as air flows from the fluid flowing hole 6a of the spring shoe 6 and the fluid flowing hole 4a of the support plate 4 through the gap and the fluid flowing hole 2d of the spring shoe 2c into the tank so as to adjust the pressure within the tank.

In the fuel cap 1, prescribed recesses 3c, 3d are formed on rear side of the outer and inner lip elements 3a, 3b of the seal member 3 so that gap h is formed between the seal member 3 and the support plate 4 at non-pressed state of the seal member 3. Consequently, even if surface precision is slightly low at the outer and inner lip elements 3a, 3b and the stepped portion 2b and the valve plate 5 to constitute seal portions thereof or the support plate 4, the error can be absorbed by the gap h between the outer and inner lip elements 3a, 3b and the support plate 4.

When the seal member 3 is held to the support plate 4, since the annular groove 3e is formed on upper side of the seal member 3 near inner periphery thereof and the assembling holding is possible by only fitting the annular groove 3e to the stepped portion 4b of the support plate 4, the support plate 4 and the seal member 3 can be easily assembled.

In the fuel cap 1, the recesses 3c, 3d are formed at rear side of the outer and inner lip elements 3a, 3b of the seal member 3 so as to absorb the error in surface precision of each member. Consequently, when the outer and inner lip elements 3a, 3b are pressed against the stepped portion 2b and the valve plate 5 being seal portions thereof through the coil springs 7, 8, the outer and inner lip elements 3a, 3b are bent respectively about contact positions X, Y as fulcrum of the seal member 3 in the recesses 3c, 3d with the support plate 4 at bottom portion in radial direction.

It is preferable for seal performance or valve opening sensitivity of the seal member 3 that distance between the outer and inner lip elements 3a, 3b and fulcrums X, Y thereof becomes equal throughout the whole circumference and biasing force by the coil springs 7, 8 is transmitted uniformly to the outer and inner lip elements 3a, 3b throughout the whole circumference.

In the fuel cap 1, however, the seal member 3 is fitted and assembled through the stepped portion 4b of the support plate 4. Moreover, the seal member 3 is usually made of elastomer and therefore resilient. Consequently, the outer and inner lip elements 3a, 3b of the seal member 3 are liable to become eccentric with respect to the support plate 4 during assembling, and care must be taken well in the assembling work. If care is not taken, distance between the outer and inner lip elements 3a, 3b and bottom portions of the recesses 3c, 3d as bending fulcrums X, Y thereof will not become uniform throughout the whole circumference. Since the biasing force by the coil spring 7, 8 is not uniformly transmitted to the outer and inner lip elements 3a, 3b throughout the whole surface, the seal performance of valve opening sensitivity is affected.

Consequently, the fuel cap 1 mut be improved in the assembling property of the seal member 3 to the support plate 4 and in securing the constant distance of the lip elements to the bending fulcrums throughout the whole circumference to affect the seal performance or valve opening sensitivity.

SUMMARY OF THE INVENTION

An object of the invention is to provide a cap with valve wherein during assembling of a seal member to a support plate constant distance of lip elements to bending fulcrums throughout the whole circumference can be secured without troublesome work.

Above object can be attained by a cap with valve comprising a cap body having a fluid flow path and a prescribed seal portion in the fluid flow path; a seal member disposed in the fluid path of the cap body, and having lip elements projecting at peripheries throughout the whole circumference and recesses formed at rear side of the lip elements with constant radial length throughout the whole circumference, and making the lip elements abut on the seal portion; a support plate disposed in the fluid flow path of the cap body for holding the seal member from rear side of the lip elements and for pressing the seal member against the seal portion; and arc-shaped projections formed on opposite surfaces at rear side of the lip portion in the support plate and fitted to the seal member in the recesses corresponding the whole circumference of bottom portion in radial direction.

In the cap with valve according to the invention, in the above-mentioned constitution, when the seal member is assembled and held to the support plate, projections of the support plate is fitted to the whole circumference of bottom portion in recesses of the seal member. Contact positions of the seal member at the recesses with the projections become bending fulcrums of the lip elements in the seal member.

That is, during the assembling work, even if the seal member is to be assembled to the support plate in eccentricity shifted from prescribed position, the eccentricity is restricted because arc-shaped projections of the support plater are fitted to whole circumference of bottom portion of recesses of the seal member. Consequently, distance between the lip elements and the bending fulcrums becomes uniform throughout the whole circumference of the seal member.

Consequently, in the cap with valve according to the invention, when the seal member is assembled to the support plate, constant distance of the lip elements to the bending fulcrums throughout the whole circumference can be secured by only applying simple work that the projection of the support plate is fitted to bottom portion of the recess of the seal member throughout the whole circumference.

DESCRIPTION OF THE PREFERRED EMBODIMENTS

Preferred embodiments of the invention will now be described referring to the accompanying drawinds. Similar parts to those of the prior art are designated by the same reference numerals, and the description shall be omitted.

Figure 3:
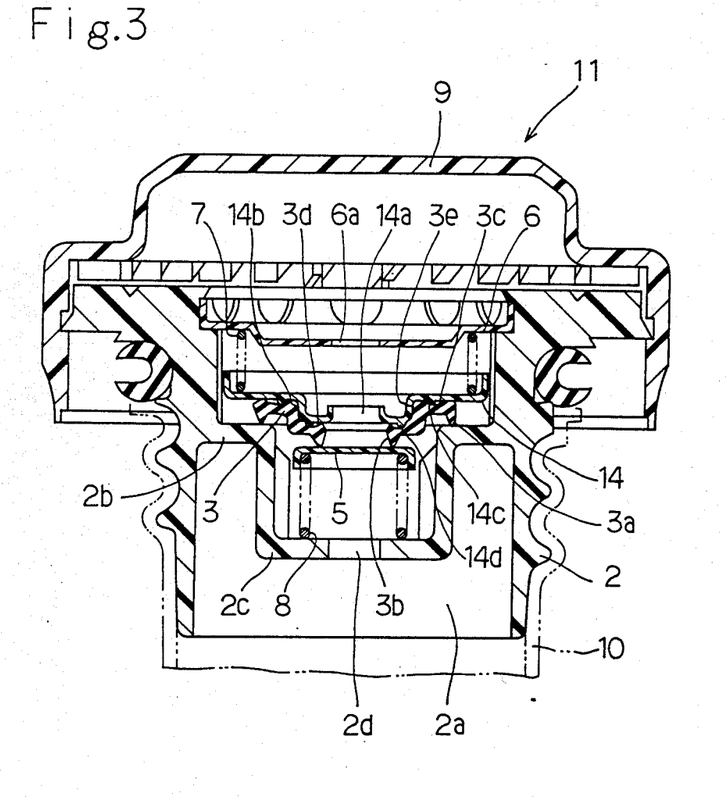
FIG. 3 is a sectional view of a cap with valve as a first embodiment of the invention.
Figure 4:
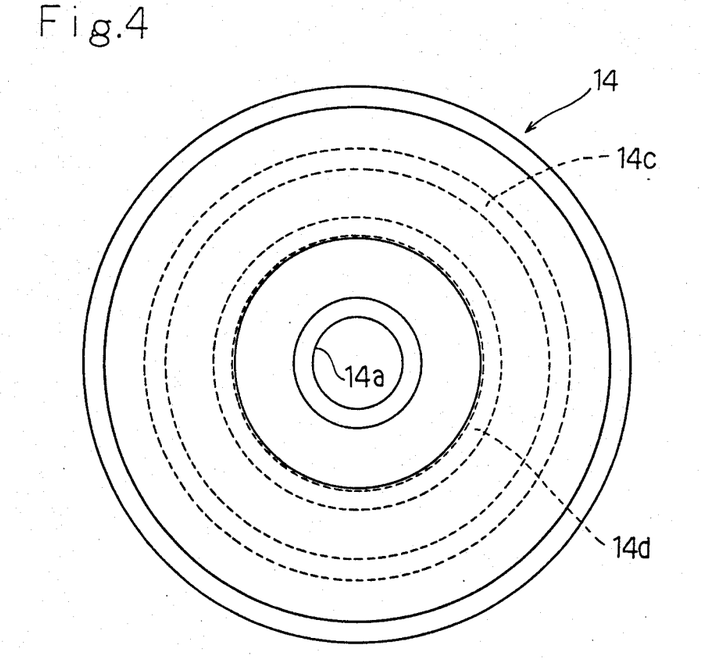
FIG. 4 is a plan view of a support plate to be used in the first embodiment.

A cap with valve as a first embodiment of the invention shown in FIG. 3 is a fuel cap 11 in similar constitution to the prior art, and a support plate 14 is provided with a fluid flowing hole 14a and a stepped portion 14b in similar manner to the prior art. The first embodiment is different from the prior art in that the support plate 14 is provided at opposite surface on rear side of outer and inner lip elements 3a, 3b of a seal member 3 with arc-shaped projections 14c, 14d to be fitted to the whole circumference of bottom portion in the radial direction of the seal member 3 in recesses 3c, 3d on rear side of the outer and inner lip elements 3a, 3b during assembling the seal member 3 (refer to FIGS. 4 and 5).

Figure 5:
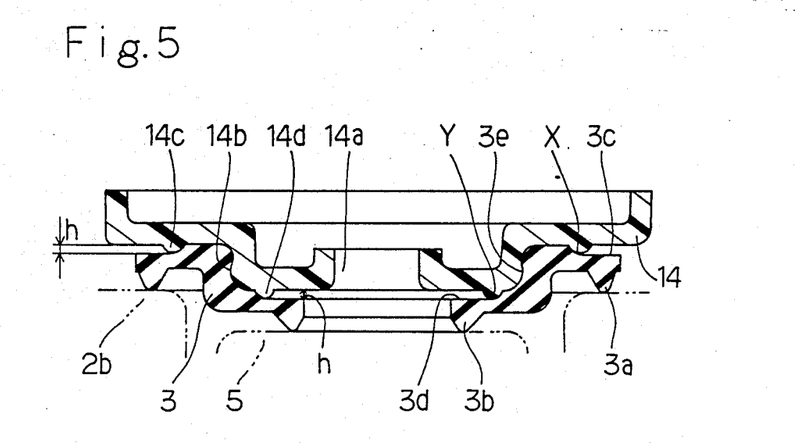
FIG. 5 is a sectional view of the first embodiment illustrating state of a seal member assembled to a support plate.

In the fuel cap 11 of the first embodiment, assembling of the seal member 3 to the support plate will be described. During the assembling, an annular groove 3e of the seal member 3 is fitted to a stepped portion 14b of the support plate 14, and the projections 14c, 14d of the support plate 14 are fitted to the whole circumference of bottom portion in the recesses 3c, 3d of the seal member 3 respectively.

Contact positions in the recesses 3c, 3d with the projections 14c, 14d become bending fulcrums X, Y of the outer and inner lip elements 3a, 3b respectively. Even if the seal member 3 is to be assembled to the support plate 14 in eccentricity shifted from prescribed position due to bending of the seal member 3 or the like, eccentricity between the seal member 3 and the support plate 14 is restricted because the arc-shaped projections 14c, 14d are fitted to the whole circumference of bottom portion of the recesses 3c, 3d respectively. Consequently, distance between the outer and inner lip elements 3a, 3b and the bending fulcrums X, Y becomes uniform throughout the whole circumference of the outer and inner lip elements 3a, 3b of the seal member 3.

After the seal member 3 is assembled to the support plate 14, a spring 8, a valve plate 5, the support plate 14 with the seal member 3 assembled, a spring 7 and a spring shoe plate are assembled in sequence thereby the fuel cap 11 is constituted. Working mode of the fuel cap 11 at use state is similar to that of the fuel cap 1 in the prior art.

In the fuel cap 11 of the first embodiment, both projections 14c, 14d are fitted to the recesses 3c, 3d on rear side of the outer and inner lip members 3a, 3b in the seal member 3. However, in relation between the annular groove 3e of the seal member 3 and the stepped portion 14b of the support plate 14, if the recess 3d at inner circumferential side of the seal member 3 or the inner lip elements 3b is pulled slightly stronger towards outside in the radial direction during the fitting action, the eccentricity to the support plate 14 at inner circumferential side will be restricted. Consequently, in this case, the projection 14d at inner circumferential side of the support plate 14 may be omitted. Also, one of the two lip elements may be pulled in the radial direction, ad the projection may be fitted only to bottom portion of the recess at rear side of one lip element is shown in a cap with valve of a second embodiment of FIG. 6.

Figure 6:
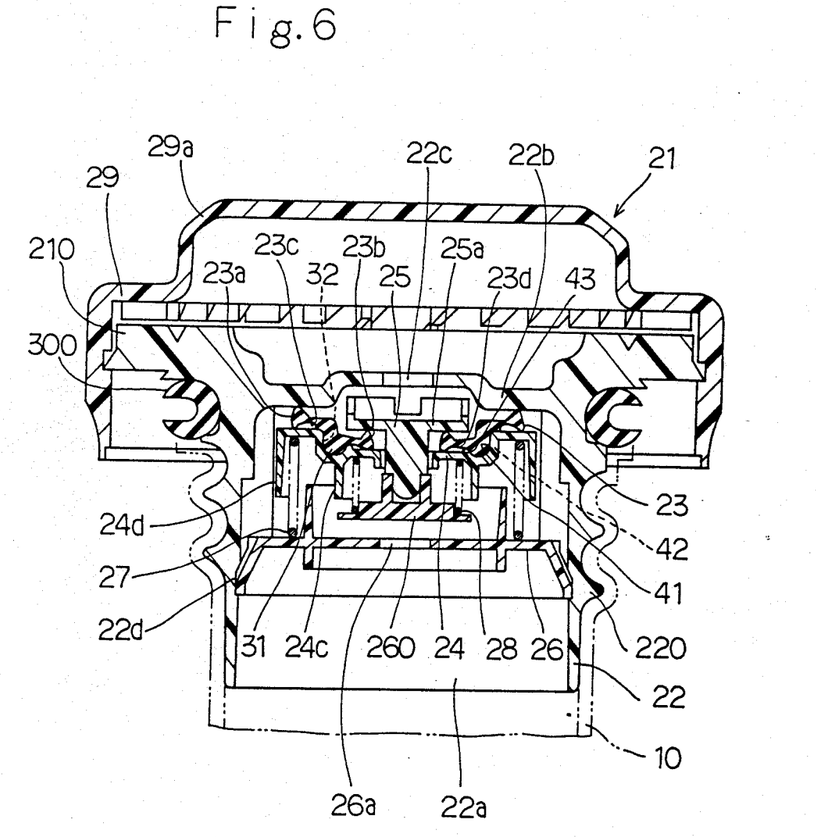
FIG. 6 is a sectional view of a cap with valve as a second embodiment of the invention.

The cap with valve in the second embodiment is a fuel cap 21 to be installed to a filler neck of a fuel tank for an outomobile in similar manner to the prior art. The cap 21 is composed of a cap body 22 made of plastic material such as polyacetal in nearly cylindrical form, and an upper cover 29 made of plastic material such as polyamide in disc-like form and fitted to a flange 210 on upper end of the cap body 22 and provided with a grasping portion 29a.

A thread 220 for installing the filler neck 10 is provided on outer circumference of the cap body 22, and a seal ring 300 is installed on outside of lower surface of the flange 210.

A fluid flow path 22a leading in the axial direction is formed in inside of the cap body 22. A ceiling plate 22b is formed on upper side of the cap body 22, and a fluid flowing hole 22c is formed at the center of the ceiling plate 22b.

A seal member 23 of elastomer, a support plate 24 of plastic material such as polyacetal, a seal plate 25, spring shoe plates 26, 260, and coil springs 17, 18 are arranged in the fluid flow path 22a at lower side of the ceiling plate 22b.

Figure 7:
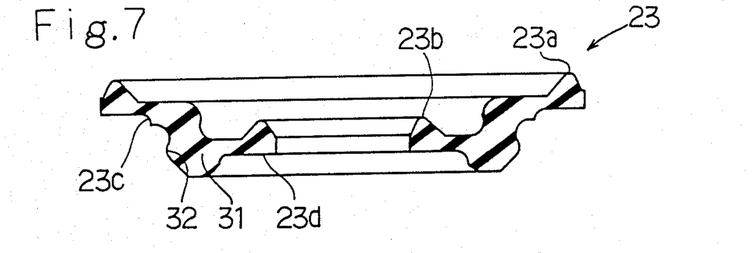
FIG. 7 is a sectional view of a seal member in the second embodiment.

As clearly seen in FIG. 7, the seal member 23 comprises an outer lip element 23a and an inner lip element 23b projecting upwards at edge of outer and inner circumferences respectively. The seal member 23 is a ring body, and step difference is formed so that the inner lip element 23b is disposed at lower side of the outer lip element 23a. Seal portion of the outer lip element 23a is periphery of the fluid flowing hole 22c at lower side of the ceiling plate 22b of the cap body 22. Seal portion of the inner lip member 23b is a lower surface of a flange 25a at upper side of the seal plate 25. Recesses 23c, 23d each having constant radial length are formed on whole circumference of rear surface of the outer and inner lip elements 23a, 23b in the seal member 23 so that gap h is produced between the seal member 23 and the support plate 24 as hereinafter described at non-pressed atate of the lip elements 23a, 23b to prescrived seal portions (refer to FIG. 10).

The seal member 23 is further provided with a projection 31 projecting downwards on whole circumference of rear surface of the outer and inner lip elements 23a, 23n at intermediate position. A convex portion 32 is formed throughout whole circumference on outside of the projection 31.

Figure 8:
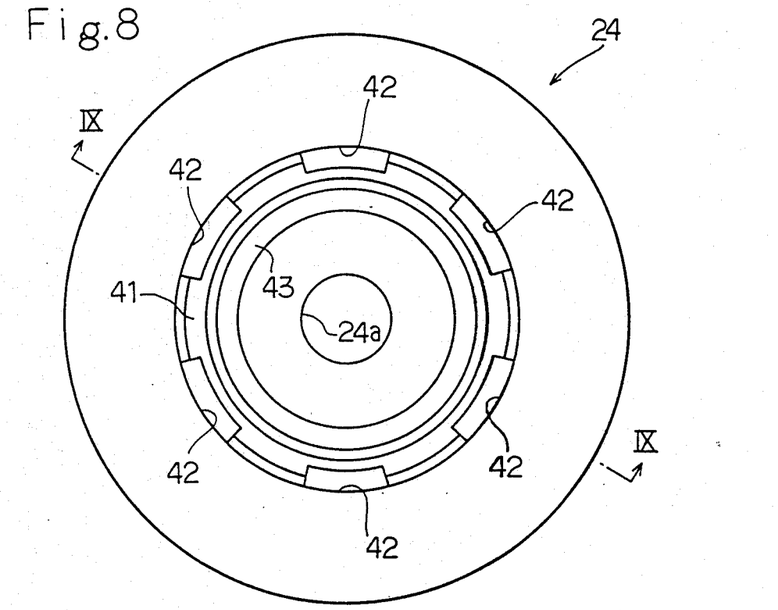
FIG. 8 is a plan view of a support plate in the second embodiment.
Figure 9:
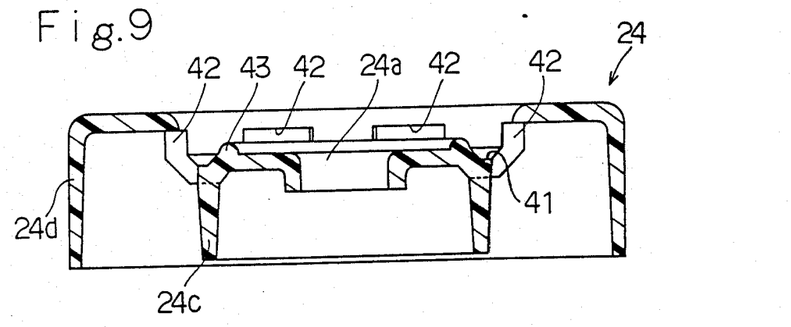
FIG. 9 is a sectional view taken in line IX—IX of FIG. 8.

As shown in FIGS. 8 and 9, the support plate 24 is formed in a ring body and provided with a fluid flowing hole 24a at the center and with a stepped portion corresponding to the stepped portion of the seal member 23. An annular groove 41 to enable fitting of the projection 31 of the seal member 23 is formed on upper side of the support plate 24. Six recesses 42 are radially formed on outside of an inner circumferential surface of the annular groove 41. These recesses 42 are formed to penetrate the support plate 24 in the radial direction. These recesses 42 are also formed so that the convex portion 32 of the projection 31 can be locked on upper periphery when the projection 31 of the seal member 23 is fitted to the annular groove 41.

An arc-shaped projection 43 is formed at prescribed position on upper side of the support plate 24. When the projection 31 and the convex portion 32 in the seal member 23 are fitted and locked to the annular groove 41 and the recess 42, the arc-shaped projection 43 is fitted to bottom portion of the recess 23d at rear side of the inner lip 23b at inside of the projection 31 without forming the convex portion 32 (outside position in the radial direction of the seal member 23 in the recess 23d), and formed corresponding to shape of the bottom portion. Numerals 24c, 24d designate cylindrical ribs for guiding the coil springs 27, 28 respectively.

Figure 10:
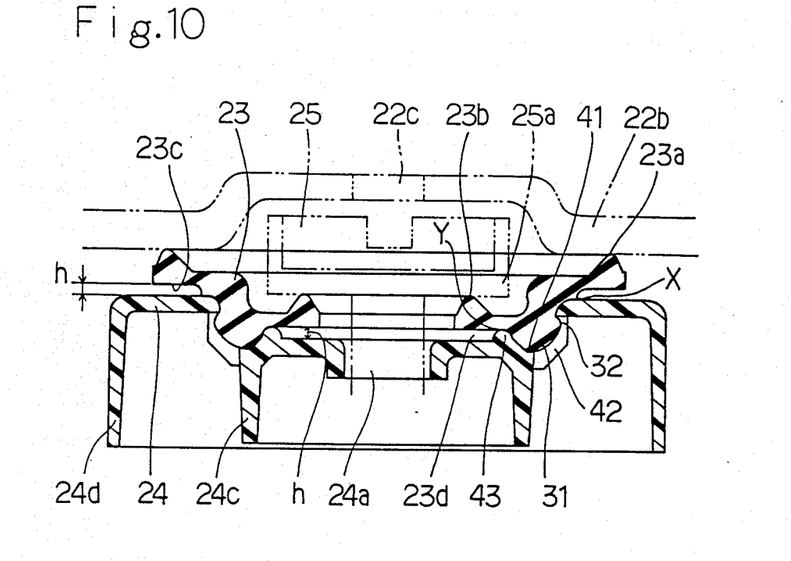
FIG. 10 is a sectional view of the second embodiment illustrating state of the seal member assembled to the support plate.

Assembling mode of the seal member 23 to the support plate 24 will be described in detail. During the assembling, the projection 31 of the seal member 23 is fitted to the annular groove 41 of the support plate 24, and the arc-shaped projection 43 is fitted to bottom portion of the recess 23d. Further, the convex portion 32 of the projection 31 is partially locked ot the recess 42 of the annular groove 41. Consequently, as shown in FIG. 10, the seal member 23 and the support plate 24 can be simply assembled without troublesome work.

After the assembling, whole circumference of bottom portion of the recess 23d positioned on rear side of the inner lip element 23b in the seal member 23 at side without forming the convex portion 32 is supported by the arc-shaped projection 43 of the support plate 24 fitted corresponding to shape of the bottom portion. That is, contact position of bottom portion of the recess 23d on rear side of the inner lip element 23b with the arc-shaped projection 43 becomes bending fulcrum Y of the inner lip element 23b. At the same time, the inner lip element 23b can be assembled to the support plate 24 without eccentricity in similar manner to the first embodiment. Consequently, distance between the inner lip element 23b and the bending fulcrum Y becomes uniform throughout the whole circumference.

On the other hand, the outer lip element 23a in the seal member 23 at side forming the convex portion 32 becomes as follows. Bottom portion of the recess 23c at rear side of the outer lip element 23a (inside position in the radial direction of the seal member 23 at the recess 23c) is pulled slightly inwards in the radial direction of the seal member 23 due to locking of the convex portion 32 to the recess 42 of the annular groove 41 of the support plate, thereby eccentricity to the support plate is restricted and arrangement to the prescribed position is performed. Consequently, distance between the outer lip element 23a and contact position with the support plate 24 at bottom portion of the recess 23c being the bending fulcrum X of the outer lip element 23a becomes uniform throughout the whole surface.

Consequently, if the cap is restricted to that where distance of other lip element to the bending fulcrum is constant as in the fuel cap 21 of the second embodiment, the arc-shaped prejection 43 may be fitted only to bottom portion of one recess 23d at rear side of the outer and inner lip elements 23a, 23b.

In the fuel cap 21 of the second embodiment, the convex portion 32 of the seal member 23 is locked to the recess 42 of the support plate 24 during the assembling. That is, in the fuel cap 21, when the convex portion 32 is locked to the recess 42 during the assembling, the assembling completion can be easily confirmed by sense of the pressed state. Consequently, in the cap 21, the assembling workability between the seal member 23 and the support plate 24 is good in comparison to the prior art or the first embodiment.

In the fuel cap 21 of the second embodiment, after the seal member 23 is assembled to the support plate 24, through the fluid flowing hole 24a of the support plate 24, the coil spring 28 is interposed between lower surface at inner periphery of the support plate 24 and the spring shoe plate 260 and the seal plate 25 is joint to the spring shoe plater 260 by means of welding, bonding, fitting or the like. And then the coil spring 27 is interposed on lower surface at outer periphery of the support plater 24 and arranged together with the spring shoe plate 26 within the cap body 22. The spring shoe plate 26 is fitted to the annular groove 22d on inner circumference of the cap body 22 thereby the fuel cap 21 can be constituted.

Operation mode of the fuel cap 21 will be described. When pressure in a fuel tank (not shown) is positive, the seal plate 25 and the spring shoe plate 260 are elevated against the biasing force of the spring 28. Since the inner lip element 23b is separated from lower surface of the flange 25a of the seal plate 25 being seal portion of the inner lip element 23b, fluid such as air passes from the fluid flowing hole 26a of the spring shoe plate 26 through its gap and the fluid flowing hole 22c of the ceiling plate 22b of the cap body 22 and flows out of the tank thereby the positive pressure within the tank is eliminated. On the contrary, when the pressure in the tank is negative, the support plate 24, the seal member 23, the seal plate 25, the spring show plate 260 and the spring are lowered against the biasing force of the spring 27. Since the outer lip element 23a is separated from periphery of the fluid flowing hole 22c of the ceiling plate 22b of the cap body 22 being seal portion of the outer lip element 23a, fluid such as air outside the tank passes from the fluid flowing hole 22c of the ceiling plate 22b throught its gap and the fluid flowing hole 26a of the spring shoe plate 26 and flows into the tank thereby the negative pressure within the tank is eliminated.

In the second embodiment, the seal member 23 is provided with the stepped portion so that the inner lip element 23b is disposed lower than the outer lip element 23a. However, the stepped portion may not be formed on upper side of the support plate 24 and the outer and inner lip elements 23a, 23b may be arranged on the same plane as follwing constitution is provided. That is, if the gap h is produced between the support plate 24 and whole circumference of rear surface of the outer and inner lip elements 23a, 23b at non-compressed state and the projection 31 of the seal member 23 and the convex portion 32 thereof can be fitted and locked to the annular groove 41 of the support plate 24 and the recess 42 thereof and bottom portion of the recess 23d at rear side of the inner lip element 23b can be supported by the arc-shaped projection 43 of the support plate 24, the stepped portion may not be formed on upper side of the support plate 24 and the outer and inner lip elements 23a, 23b may be arranged on the smae plane.

Figure 11:
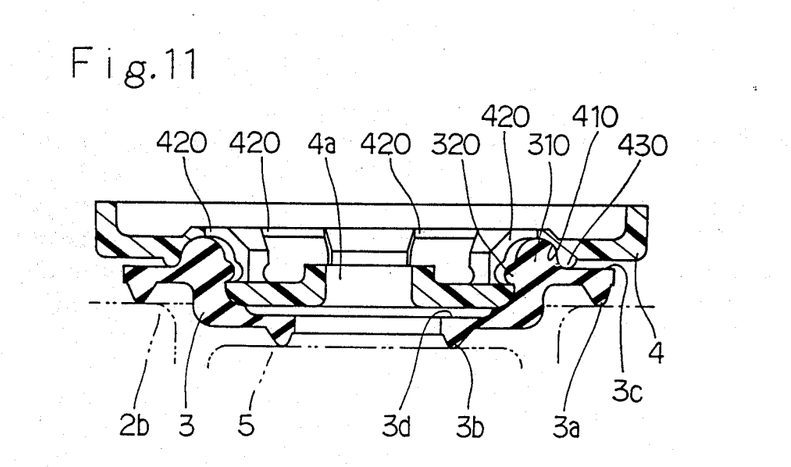
FIG. 11 is a sectional view illustrating an application example of the second embodiment.

Further in the second embodiment, the convex portion 32 is formed on outer circumferential side of the projection 31 in the seal member 23. However, when the second embodiment is applied to the fuel cap 1 in the prior art and an annular projection 310 is formed on rear side of the outer and inner lip elements 3a, 3b in the seal member 3 as shown in FIG. 11, a convex portion 320 may be formed on inner circumferential side of the projection 310. In this case, an annular groove 410 corresponding to the support plate 4 and a recess 420 or an arc-shaped projection 430 supporting bottom portion of the recess 3c at rear side of the outer lip element 3a may be formed as remedy. Also in this case, of course, the outer and inner lip elements 3a, 3b in the seal member may be arranged on the same plane as above described and similar effect to the second embodiment can be obtained.

In the fuel caps 11, 21 of the first and second embodiments, the seal member 13, 23 are ring-shaped and provided with two lip elements 13a, 13b; 23a, 23b respectively. However, the invention may be applied to a cap with valve for negative pressure or positive pressure having a disk-like seal member which requires only one lip element.

What is claimed is:

1. A cap with valve comprising:
   (a) a cap body having a fluid flow path and a prescribed seal portion provided in the fluid flow path;
   (b) a seal member disposed in the fluid flow path of said cap body and provided with lip elements projecting throughout whole circumference of periphery and with recesses formed throughout whole circumference at rear side of said lip elements and having contact length in the radial direction, said lip elements being capable of abutting on said seal portion;
   (c) a support plate disposed in the fluid flow path of said cap body for holding said seal member from rear side of said lip elements and for urging said seal member against said seal portion; and
   (d) an arc-shaped projection formed on opposite surface at rear side of said lip elements in said support plate and fitted corresponding to whole circumference of bottom portion in the radial direction of said seal member at said recesses.

2. A cap with valve as set forth in claim 1, wherein said seal member is a ring body having the lip elements projection downwards at outer and inner peripheries respectively, said seal member having an annular groove so that the inner lip elembet is disposed lower than the outer lip element, and said support plate is provided with stepped portion to enable fitting of said annular groove of said seal member and said annular groove is fitted to said stepped portion thereby said support plate holes said seal member at lower surface thereof.

3. A cap with valve as set forth in claim 1, wherein said seal member is a ring body having the lip elements projecting downwards at outer and inner poripheries respecvely, said seal member having an ammular groove so that the inner lip element is disposed lower than the outer lip elements, and said support plate is provided with stepped portion to enable fitting of said annular groove of said seal member and said annular groove is fitted to said stepped portion thereby said support plate holds said seal member at lower surface thereof, and said arc-shaped projection of said support plate is formed only at position corresponding to whole circumference of bottom portion of the recess at rear side of the outer lip element of said seal member.

4. A cap with valve as set forth in claim 1, wherein said seal member is a ring body having the lip elements projecting in the same direction at outer and inner peripheries respectively, and provided with a projection formed throughout whole circumference of rear surface at intermediate portion forming said outer and inner circumferential lip elements and with a convex portion formed throughout whole circumference at outside or inside of said projection, and said support plate is provided with an annular groove to enable fitting of said projection for holding said seal member and a recess for locking said convex portion to outside or inside of said annular groove, and the arc-shaped projection of said support plate is formed only at position corresponding to whole circumference at bottom portion of the recess at teat side of said inner lip element or said outer lip element at side where the convex portion of said projection in said seal member is not formed.

* * * * *